United States Patent
Kroneck et al.

(10) Patent No.: US 12,358,470 B2
(45) Date of Patent: Jul. 15, 2025

(54) MOTOR VEHICLE WITH A ROOF MODULE HAVING A CLEANING DEVICE

(71) Applicant: Webasto SE, Stockdorf (DE)

(72) Inventors: Charles Kroneck, Macomb Township, MI (US); Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 301 days.

(21) Appl. No.: 18/076,705

(22) Filed: Dec. 7, 2022

(65) Prior Publication Data

US 2024/0190389 A1 Jun. 13, 2024

(51) Int. Cl.
| | |
|---|---|
| *G01S 17/931* | (2020.01) |
| *B60R 11/04* | (2006.01) |
| *B60S 1/52* | (2006.01) |
| *B60S 1/56* | (2006.01) |
| *B62D 25/06* | (2006.01) |
| *G02B 27/00* | (2006.01) |
| *B60R 11/00* | (2006.01) |

(52) U.S. Cl.
CPC ............ *B60S 1/56* (2013.01); *B60R 11/04* (2013.01); *B60S 1/52* (2013.01); *B62D 25/06* (2013.01); *G01S 17/931* (2020.01); *G02B 27/0006* (2013.01); *B60R 2011/0026* (2013.01)

(58) Field of Classification Search
CPC ..... G01S 17/931; G02B 27/0006; B60S 1/02; B60S 1/46; B60S 1/48; B60S 1/481; B60S 1/485; B60S 1/50; B60S 1/52

USPC ............................................. 296/210, 96.15
See application file for complete search history.

(56) References Cited

U.S. PATENT DOCUMENTS

| | | | |
|---|---|---|---|
| 10,328,906 B2 * | 6/2019 | Hester | B60R 11/04 |
| 10,514,303 B2 * | 12/2019 | Krishnan | G01S 13/931 |
| 2023/0242080 A1 * | 8/2023 | Krishnan | G01S 17/931 |
| | | | 701/36 |

FOREIGN PATENT DOCUMENTS

| | | | | |
|---|---|---|---|---|
| DE | 102018005793 A1 * | 1/2019 | | |
| FR | 2974050 A1 * | 10/2012 | | B60S 1/488 |

OTHER PUBLICATIONS

DE102018005793 Text (Year: 2019).*
FR2974050 Text (Year: 2012).*

* cited by examiner

*Primary Examiner* — Dennis H Pedder
(74) *Attorney, Agent, or Firm* — Fitch, Even, Tabin & Flannery, LLP (57) ABSTRACT

A roof for a motor vehicle having at least one vehicle window, the roof having a roof module having which forms a vehicle roof of the motor vehicle, the roof module having a panel component, which at least partially forms a roof skin of the vehicle roof, the roof skin serving as an outer sealing surface, at least one environment sensor configured to send and/or receive electromagnetic signals for detecting a vehicle environment through a see-through area, and at least one cleaning device having at least one cleaning nozzle. The at least one cleaning nozzle is configured to clean the see-through area and the at least one vehicle window.

8 Claims, 4 Drawing Sheets

MOTOR VEHICLE WITH A ROOF MODULE HAVING A CLEANING DEVICE

FIELD

The present disclosure relates to a roof module for forming a vehicle roof on a motor vehicle for a motor vehicle having at least one vehicle window.

BACKGROUND

Motor vehicles having a roof module are already known. Roof modules of this kind are widely used in vehicle manufacturing since these roof modules can be prefabricated as separate functional modules and can be delivered to the assembly line when assembling the vehicle. The roof module at least partially forms a roof skin of the vehicle roof at its outer surface, the roof skin preventing moisture and air flows from entering the vehicle interior. The roof skin is composed of one or more panel components, which can be made of a stable material, such as painted metal or painted or died-through plastic. The roof module can be a part of a fixed vehicle roof or a part of an openable roof sub-assembly Furthermore, the development in vehicle manufacturing is increasingly focusing on autonomously and semi-autonomously driving motor vehicles. In order to enable the vehicle controller to control the motor vehicle autonomously or semi-autonomously, a plurality of von environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the detected environment data. Roof modules which are equipped with a plurality of environment sensors are also known as roof sensor modules (RSM). For this purpose, the known environment sensors send and/or receive electromagnetic signals, such as laser beams or radar beams, allowing a data model of the vehicle environment to be generated by signal evaluation and to be used for controlling the vehicle.

The known environment sensors are typically housed in a roof module and are therefore disposed in the area of the vehicle roof, from where the vehicle environment is easily visible. The environment sensors are typically placed on top of the panel component of the roof module, which forms the roof skin, as attachments: alternatively, they can also be disposed in an opening of the panel component in a retractable and deployable manner. During use of the environment sensor, ambient conditions (e.g., weather) pose the risk that a partially transparent or transparent see-through area, through which the environment sensor detects the vehicle environment, accumulates dirt, i.e., becomes opaque to the environment sensor. This results in losses and/or interference in the detection of the vehicle environment, which can lead to a complete failure of the environment sensor in question in the worst case.

The use of a cleaning device for cleaning the see-through area is sufficiently known. Similar to spray nozzles of a windshield or headlight wiper system, the known cleaning devices are typically disposed statically or movably on the outer surface of the roof skin in an area of the roof module or the panel component. An aqueous soap solution or alternatively a compressed gas, such as pressurized air, can be used as a cleaning fluid.

Cleaning devices for cleaning vehicle windows, such as a windshield or a rear window, are sufficiently known, as well. These cleaning devices also have at least one cleaning nozzle, which applies a cleaning fluid to the vehicle window in question in order to clean it, typically in combination with a window wiper assembly.

A conventional cleaning device often may have a storage vessel, such as a tank or a reservoir, in which the cleaning medium, i.e., a cleaning fluid, such as a liquid or a gas, is stored. The cleaning fluid is transported to at least one ejector, e.g., a cleaning nozzle, via a volume generator (e.g., a pump) and/or a pressure generator (e.g., a compressor) and other means of distribution, e.g., hoses and/or valves, and is applied to the target surface (e.g., a see-through area and/or a vehicle window) to be cleaned. Such a cleaning device is typically controlled by a control device which is connected to the vehicle architecture, such as a driver assistance system. The reservoir and/or the volume generator and/or the pressure generator are typically combined, at least in terms of installation space, and are often disposed in an engine compartment and/or a trunk of the motor vehicle. The other means of distribution, on the other hand, are distributed throughout the motor vehicle, whereas the ejectors, i.e., the cleaning nozzles, are installed in the proximity of the area to be cleaned.

In the state of the art, the cleaning devices for cleaning the vehicle window(s) and the at least one see-through area of the at least one environment sensor are configured as separate features and/or systems, which means that a plurality of technical components required for each cleaning device are redundantly installed in the whole vehicle. For instance, known motor vehicles have a cleaning device for cleaning the windshield, a cleaning device for cleaning a front see-through area of a front environment sensor, a cleaning device for cleaning a rear see-through area of a rear environment sensor, a cleaning device for cleaning a rear window, and possibly other cleaning devices for cleaning vehicle headlights and the like.

The redundant components lead to higher costs and a higher weight of the whole vehicle. Also, the redundant components increase the installation space required, which is available as a limited resource in vehicle manufacturing. Overall, the multiple cleaning devices installed in the vehicle increase the complexity of the whole vehicle. Moreover, multiple cleaning devices each having multiple cleaning nozzles affect the freedom of design and styling of the whole vehicle. Moreover, the separate cleaning devices each require separate installation steps and subsequently separate maintenance steps, which increases the complexity and the overall costs from the perspective of the vehicle manufacturer and also the vehicle buyer and/or the vehicle owner.

SUMMARY

In view of the deficiencies in the prior art, an object of the present disclosure provides a module for a motor vehicle that avoids or reduces the disadvantages mentioned above and in particular allows reducing a complexity of the whole vehicle in the area of the cleaning devices and thus saving costs and weight for the whole vehicle.

According to one approach of the present embodiments, a motor vehicle is provided that may have at least one vehicle window and at least one roof module, which forms a vehicle roof of the motor vehicle. The roof module may have a panel component, which at least partially forms a roof skin of the vehicle roof, the roof skin serving as an outer sealing surface, at least one environment sensor configured to send and/or receive electromagnetic signals for detecting a vehicle environment through a see-through area separated from the at least one vehicle window and arranged at the at least one roof module, and at least one cleaning device having at least one cleaning nozzle, wherein the at least one cleaning nozzle is configured to clean the see-through area and the at least one vehicle window. Advantageous features of the present embodiments are also provided herein. Moreover, any and all combinations of at least two features disclosed in the description, the claims, and/or the figures fall within the scope of the present embodiments. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The motor vehicle according to the present embodiments may have at least one vehicle window and at least one roof module. The roof module forms a vehicle roof of the motor vehicle. The roof module has a panel component, which at least partially forms a roof skin of the vehicle roof, the roof skin serving as an outer sealing surface. Furthermore, the roof module has at least one environment sensor configured to send and/or receive electromagnetic signals for detecting the vehicle environment through a see-through area separated from the at least one vehicle window and arranged at the at least one roof module, and at least one cleaning device having at least one cleaning nozzle. According to the present embodiments, the at least one cleaning nozzle is configured to clean the see-through area and the at least one vehicle window.

The inventors have realized that the problems existing in the state of the art, namely the high complexity due to multiple cleaning devices installed in the motor vehicle and the accompanying high costs and the high weight can be reduced or even eliminated by disposing the at least one cleaning device in the roof module and configuring it to clean both the at least one see-through area and the at least one vehicle window. So, according to the present embodiments, no longer are multiple separate cleaning devices installed in the motor vehicle to clean the at least one vehicle window and the at least one see-through area separately. Instead, at least one cleaning device that combines the cleaning function of the at least one see-through area and the at least one vehicle window in a device disposed only in the roof module is installed and/or integrated in the roof module.

The combination of the cleaning functions by disposing the at least one cleaning device in the at least one roof module has the advantages of a reduced overall complexity, a reduced number of components, features and/or other (functional) technological components, and an improved freedom in designing the vehicle and/or the vehicle styling. Moreover, the modularity of the at least one roof module and/or the whole vehicle can be improved since the whole cleaning device(s) needed for the motor vehicle can be preinstalled in the at least one roof module, for example. A preassembled roof module of this kind can be delivered to an assembly line and/or a production line as a structural unit, where it can be disposed and/or installed on the motor vehicle, in particular on a vehicle body and/or a roof frame. This reduces the assembly work. Also, the amount of maintenance required is reduced. Overall, the vehicle according to the present embodiments reduces the costs and the total weight of the motor vehicle.

In the case at hand, the expression "at least one" means that the motor vehicle according to the present embodiments may have one or more than one such component. The roof module is preferably a roof sensor module, in particular a roof sensor module having a plurality of environment sensors. Of course, the environment sensor can also be part of a sensor module that is in the roof module and may have the environment sensor as well as other electrical components and/or mechanical parts (e.g., a housing, parts of a housing and/or a drive etc.). The vehicle window can be a windshield and/or a side window and/or a rear window. The roof module can have multiple see-through areas. The roof module may also have multiple environment sensors, which look through common or different see-through areas in order to detect the vehicle environment. The see-through areas can be provided in different places of the roof module and can basically be aligned and/or oriented in any manner relative to a longitudinal vehicle direction and/or a vehicle width direction. The at least one cleaning device can be disposed in a front area of the vehicle roof and/or a rear area of the vehicle roof and/or a lateral area of the vehicle roof. The roof module preferably has multiple cleaning devices and/or a cleaning device having multiple cleaning nozzles. Thus, multiple see-through areas and/or multiple vehicle windows, in particular a windshield and/or a rear window, can preferably be cleaned by the cleaning device(s) installed in the roof module. Particularly preferably, no cleaning device for cleaning the vehicle window(s) is installed anywhere but in the at least one roof module. Only cleaning devices for cleaning vehicle headlights may be provided in other areas of the motor vehicle, where they are closer to a vehicle headlight in question, because of spatial conditions. The cleaning nozzle can be referred to as an ejector, which is configured to eject a cleaning fluid and/or a cleaning medium.

The roof module can form a structural unit in which features for autonomous or semi-autonomous driving assisted by driver assistance systems are integrated and which can be placed on a vehicle carcass as a structural unit by a vehicle manufacturer. Furthermore, the roof module according to the present embodiments can be a purely fixed roof or a roof including a roof opening system. Moreover, the roof module can be configured for use with a passenger car or a utility vehicle. The roof module can preferably be provided as a structural unit in the form of a roof sensor module (RSM) in which the environment sensors are provided so as to be inserted into a roof frame of a vehicle body as a suppliable structural unit.

The environment sensor according to the present embodiments can basically be configured in various ways and may in particular have a lidar sensor, a radar sensor, an optical sensor, such as a (multi-directional) camera, and/or the like. Lidar sensors operate in a wavelength range of 905 nm or about 1550 nm, for example. The material of the roof skin and of the panel component in the see-through area should be transparent to the wavelength range used by the environment sensor and should hence be selected as a function of the wavelength(s) used by the environment sensor.

In a preferred embodiment, the cleaning device has at least one fluid line and/or at least one fluid control valve and/or at least one volume generator, in particular a pump, and/or at least one pressure generator, in particular a compressor, and/or at least one fluid reservoir, which is/are disposed in an installation space provided by the roof module. So, particularly preferably, all components of the cleaning device are disposed in the roof module, allowing the latter to be prefabricated as a fully functional unit in terms of cleaning. Particularly preferably, for example, the fluid reservoir and/or the at least one volume generator and/or the at least one pressure generator is/are housed in the roof module. In this manner, more installation space is available in an area of an engine compartment compared to the state of the art, for example, and this installation space can be used for other things, in particular for components for the mechanization and/or the automation of the overall vehicle, in particular in the case of electric vehicles and/or hybrid vehicles and/or autonomous or semi-autonomous vehicles.

In a preferred alternative embodiment, the cleaning device has at least one fluid line and/or at least one fluid control valve and/or at least one volume generator, in particular a pump, and/or at least one pressure generator, in particular a compressor, and/or at least one fluid reservoir, which is/are also at least partially disposed in an installation space provided by the motor vehicle. Thus, according to the present embodiments, functional components of the cleaning device(s) can further be disposed in an engine compartment, for example, or in another installation space of the motor vehicle if they are components which are too large to be disposed or accommodated in the roof module, for example. Thus, according to the present embodiments, it is advantageous for a major part of the components of the cleaning device to be housed in the at least one roof module and thus no longer be distributed throughout the whole vehicle or the entire installation space of the vehicle as is the case in the state of the art. This makes it possible for at least a major part of the cleaning device to be preinstalled in the at least one roof module so as to then prefabricate such a roof module as a structural unit for an OEM, for example.

In a preferred embodiment, the at least one cleaning nozzle has at least two fluid ejection areas. One of the fluid ejection areas is directed at the see-through area in order to eject in particular a cleaning fluid and/or a cleaning medium in the direction of the at least one see-through area. The other fluid ejection area is directed at the at least one vehicle window in order to eject in particular a cleaning fluid and/or a cleaning medium in the direction of the at least one vehicle window. Particularly preferably, such a cleaning nozzle may have a supply channel, for example, which splits into at least two exit channels. End areas of the exit channels preferably each form an opening from which the cleaning fluid and/or a cleaning medium can be ejected. The opening can preferably taper in the shape of a nozzle and/or conically and/or have any other predetermined shape that allows the cleaning fluid and/or the cleaning medium to be ejected from said opening in a predetermined manner, e.g., as a jet and/or a cone and/or in another manner. Such a cleaning nozzle can be made from a solid material block into which a supply channel is preferably introduced, the supply channel ending in at least two exit channels. This can be produced by drilling and/or cutting a T-shape into a material block.

In a preferred embodiment, the at least one cleaning nozzle may have at least two fluid ejection channels, which are in particular independent and/or separate from each other, one fluid ejection channel being directed at the see-through area and the other fluid ejection channel being directed at the at least one vehicle window. The fluid ejection channels can each be configured in basically any manner. Preferably, the at least two fluid ejection channels are provided separately from each other in a material block of the at least one cleaning nozzle, the material block forming a nozzle body. Thus, the at least one cleaning nozzle can clean the at least one vehicle window and the at least one see-through area. This, in turn, is of great advantage component-wise since the same cleaning effect can be achieved with fewer components. Moreover, the at least two separate fluid ejection channels are advantageous since they can be supplied with the cleaning fluid and/or the cleaning medium separately without both the at least one see-through area and the at least one vehicle window always having to be cleaned at the same time.

In a preferred embodiment, the cleaning device has at least two cleaning nozzles, one of which is directed at the see-through area and the other one of which is directed at the at least one vehicle window. Of course, the cleaning device can also have more cleaning nozzles, in principle. So, it is possible for the see-through area and the vehicle window to not necessarily be cleaned by the same cleaning nozzle. Alternatively, multiple cleaning nozzles can be provided, each of which is directed either at the see-through area or at the vehicle window, but which are all comprised by the roof module. Thus, in particular the cleaning nozzles provided in an area of transition between the hood and a vehicle window in the state of the art are moved to the roof module according to the present embodiments so that they are not distributed throughout the whole vehicle. This effectively improves the complexity of the whole vehicle structure.

In a preferred embodiment, the at least one cleaning nozzle is disposed on the roof module, in particular on the panel component, in particular in a telescopically retractable and deployable manner. Alternatively or additionally, the at least one cleaning nozzle is disposed on the roof module, in particular on the panel component, in a rotatable manner. The mobility of the at least one cleaning nozzle allows the cleaning effect to be increased, for example. Furthermore, the mobility of the at least one cleaning nozzle allows places of the see-through area and/or the vehicle window that are difficult to reach otherwise to be cleaned effectively. Also, the mobility of the at least one cleaning nozzle has the advantage that the at least one cleaning nozzle can be positioned more freely and the overall freedom in designing the roof module is consequently increased. The rotation of rotatable cleaning nozzles can preferably be effected or initiated by the pressure and/or the volumetric flow rate of the cleaning medium. The cleaning medium preferably forces the cleaning nozzle to rotate through guides in the cleaning nozzle and/or in the nozzle support and preferably acts against an elastic force which returns the cleaning nozzle into an initial position after the pressure has been relieved and/or the cleaning medium has passed through the cleaning nozzle. The rotation can also be effected by means of an additional electric motor and/or a solenoid valve and/or a piezo element.

In a preferred embodiment, the at least two fluid ejection areas can be supplied by a common valve. By opening the common valve, cleaning fluid and/or cleaning medium is preferably led to the two fluid ejection areas, which preferably enables an in particular simultaneous cleaning of the see-through area and the vehicle window. Moreover, components can be saved since the see-through area and the vehicle window can be cleaned by the actuation of a common valve.

In a preferred embodiment, the at least two fluid ejection channels can be supplied by at least two valves. This has the advantage that the see-through area can be cleaned independently from the vehicle window by actuating only the associated valve, for example. Moreover, a finer dosage of the cleaning fluid and/or the cleaning medium is possible since only one of the valves is actuated if only the vehicle window or only the at least one see-through area is dirty, for example.

In a preferred embodiment, the cleaning device is exclusively disposed in an installation space provided by the roof module. So, particularly preferably, in particular all components of the cleaning device are disposed in the installation space provided by the roof module. Thus, no other components of the at least one cleaning device are disposed in another area of the vehicle. Instead, the disposition of the components of the at least one cleaning device is limited to the roof module, allowing the latter to be prefabricated as a structural unit. The at least one cleaning device is preferably fully functional when the roof module is preassembled or merely needs to be connected to an energy source, which preferably takes place when the roof module is installed on the vehicle body.

In a preferred embodiment, the at least one environment sensor has a lidar sensor and/or a radar sensor and/or a camera sensor and/or a multi-camera sensor and/or an ultrasonic sensor. Alternatively or additionally, said environment sensor is, more generally speaking, an electrical and/or electronic and/or electromagnetic component, which means that the environment sensor can also be a light source and/or an antenna and/or a means of communication and/or another type of sending and/or receiving module in this broad interpretation.

Of course, the embodiments and the illustrative examples mentioned above and yet to be explained can be realized not only individually but also in any combination with each other without departing from the scope of the present embodiments.

An embodiment of the present embodiments is schematically illustrated in the drawings and will be discussed as an example below.

DETAILED DESCRIPTION

Figure 1:
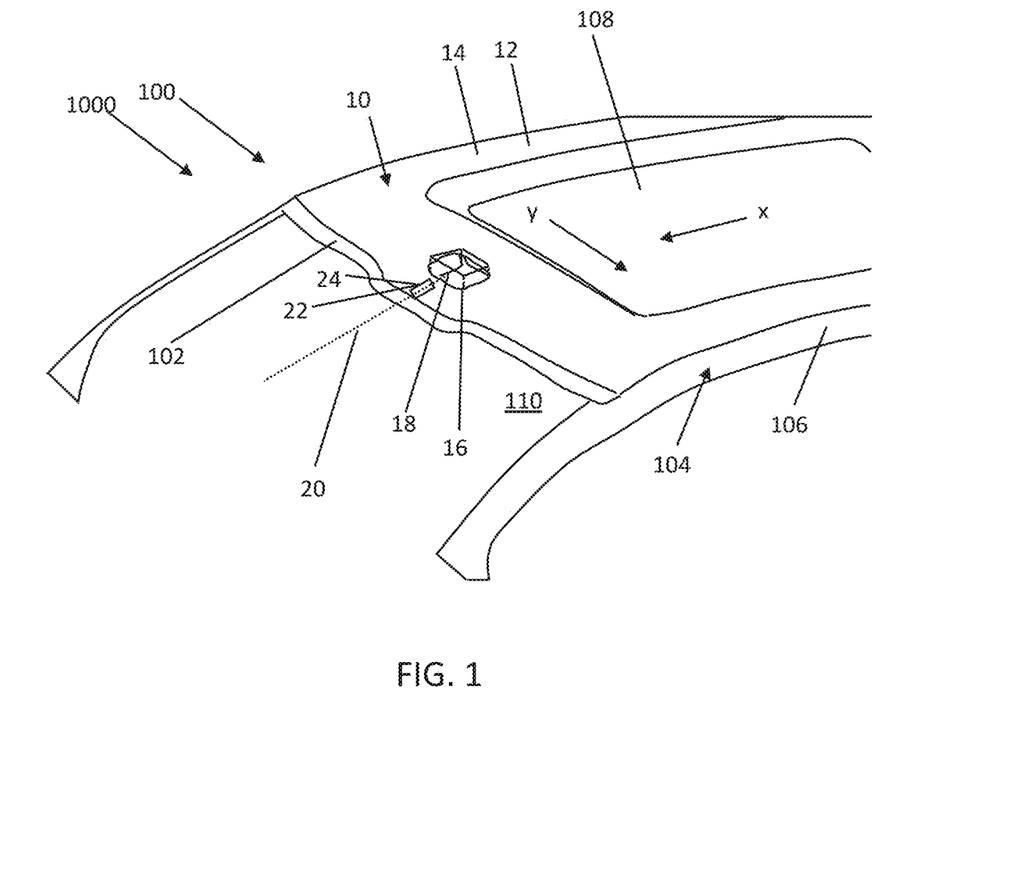
FIG. 1 is a schematic view of a motor vehicle having a roof module and a cleaning device.

FIG. 1 shows a vehicle roof 100, which has a roof module 10. Roof module 10 has a panel component 12 for forming a roof skin 14 of vehicle roof 100 of a motor vehicle 1000. An environment sensor 16 is disposed symmetrically to a longitudinal vehicle axis x (perpendicular to a vehicle width direction y) in a front area of vehicle roof 100 or roof module 10 with respect to longitudinal vehicle direction x. Environment sensor 16 is disposed directly behind a front transverse rail 102, which defines a roof header of motor vehicle 1000. Roof module 10 is preferably inserted into a roof frame 104 of motor vehicle 1000 or placed on the at least two transverse rails 102 and at least two longitudinal rails 106, which form roof frame 104, as a structural unit. Roof module 10 has a panoramic roof 108 in the exemplary embodiment shown. Furthermore, motor vehicle 1000 has at least one vehicle window 110. In FIG. 1, the windshield is shown as an example of vehicle window 110.

Environment sensor 16 looks through a see-through area 18, which can be provided on a housing 17 of environment sensor 16, for example, or can be formed by panel component 12. For example, see-through area 18 can be made of a preferably shatter-proof plastic or another (semi-)transparent material and can be mounted in housing 17 of environment sensor 16 or in panel component 12 as a window. See-through area 18 can form a lens.

In the case at hand, environment sensor 16 is a lidar sensor, which can send and/or receive electromagnetic signals for detecting the vehicle environment through see-through area 18. Other sensor types, such as (multi-directional) cameras, can be used, as well. Environment sensor 16 is oriented along an optical axis 20, which is parallel to longitudinal vehicle direction x in the case of FIG. 1. Environment sensor 16 has a field of view which extends essentially conically around optical axis 20 and within which environment sensor 16 can detect the surroundings of the vehicle.

According to the present embodiments, at least one cleaning device 22 is disposed on panel component 12. Cleaning device 22 has at least one cleaning nozzle 24. The at least one cleaning nozzle 24 can clean see-through area 18 and the at least one vehicle window 110.

The following figures show different configurations and/or dispositions of different embodiments of cleaning devices 22 and/or cleaning nozzles 24 according to the present embodiments. Of course, the illustrations are purely exemplary in nature. Moreover, any and all combinations of the embodiments illustrated are of course part of the present disclosure.

Figure 2A:
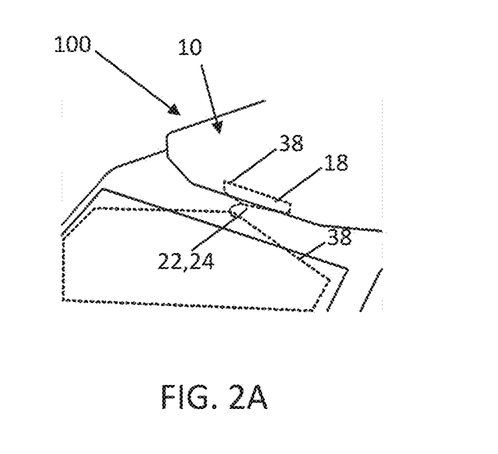
FIG. 2A is a schematic view of a motor vehicle having a roof module and a cleaning device having a cleaning nozzle having two fluid ejection areas for cleaning the vehicle window and the see-through area.
Figure 3:
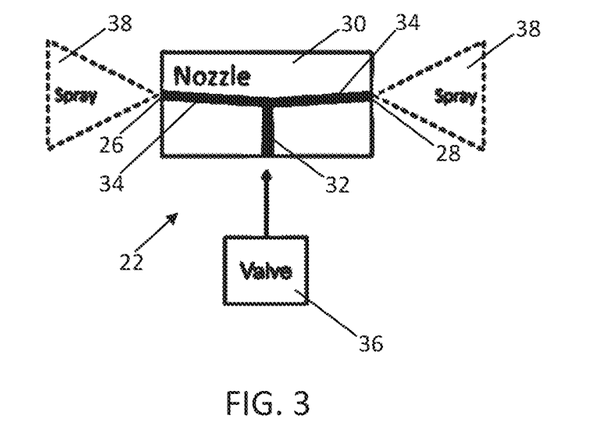
FIG. 3 is a schematic sectional view of a first exemplary embodiment of a cleaning nozzle.

FIG. 2A is a schematic view of a motor vehicle 1000, which is comprised of roof module 10 and cleaning device 22. In the case illustrated, cleaning device 22 has cleaning nozzle 24 and the two fluid ejection areas 26 and 28 (see FIG. 3) for cleaning vehicle window 110 and see-through area 18, respectively. As can be seen in the sectional view of FIG. 3, cleaning nozzle 24 has a solid, in particular one-piece, nozzle body 30 for this purpose, for example. A supply channel 32, which ends in at least two exit channels 34, can preferably be formed in nozzle body 30. The at least two exit channels 34 in turn end in fluid ejection areas 26 and 28. The cleaning nozzle 24 shown in FIG. 2A and FIG. 3 is preferably supplied by a single valve 36. Valve 36 is preferably configured to selectively and/or partially open and/or close supply channel 32 in order to transport the cleaning fluid and/or the cleaning medium to fluid ejection areas 26 and 28. Fluid ejection area 26 is preferably directed at vehicle window 110. Fluid ejection area 28 is preferably directed at see-through area 18. Exemplary spraying areas 38 are indicated in FIGS. 2A and 3.

Figure 2B:
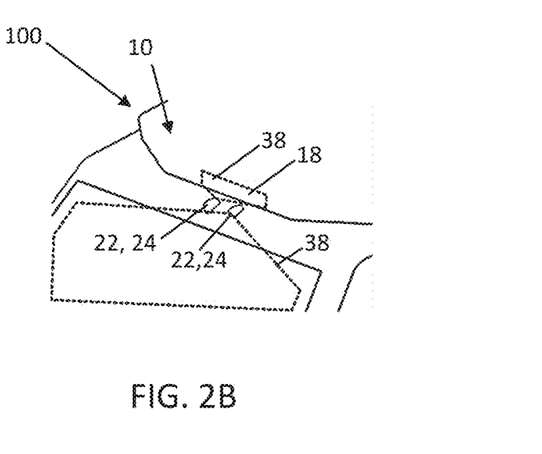
FIG. 2B is a schematic view of a motor vehicle having a roof module and a cleaning device having two cleaning nozzles for cleaning the vehicle window and the see-through area.
Figure 4:
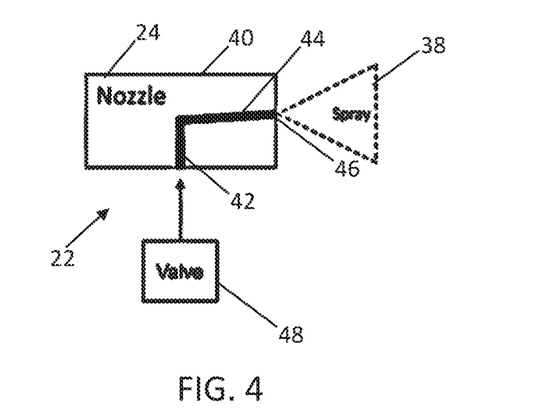
FIG. 4 is a schematic sectional view of a second exemplary embodiment of a cleaning nozzle.

FIG. 2B is a schematic view of motor vehicle 1000, which is comprised of roof module 10 and cleaning device 22. Cleaning device(s) 22 have two cleaning nozzles 24 as an example. One cleaning nozzle 24 is configured to clean vehicle window 110 and is therefore directed at vehicle window 110. The other cleaning nozzle 24 is configured to clean see-through area 18 and is therefore directed at see-through area 18. As can be seen in the sectional view of FIG. 4, cleaning nozzle 24 has a solid, in particular one-piece, nozzle body 40 for this purpose. A supply channel 42, which ends in an exit channel 44, can preferably be formed in nozzle body 40. Exit channel 44 ends in a fluid ejection area 46, which is directed either at vehicle window 110 or at see-through area 18. The cleaning nozzle 24 shown in FIG. 2B and FIG. 4 is preferably supplied by a single valve 48. Valve 48 is preferably configured to selectively and/or partially open and/or close supply channel 42 in order to transport the cleaning fluid and/or the cleaning medium to fluid ejection area 46.

Figure 2C:
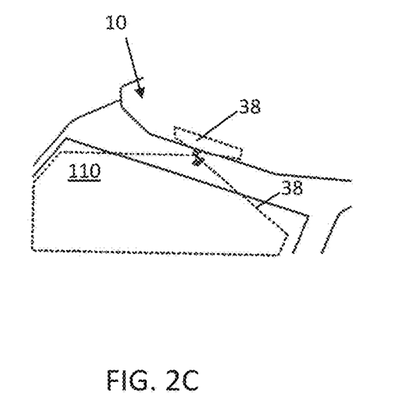
FIG. 2C is a schematic view of a motor vehicle having a roof module and a cleaning device having a deployable cleaning nozzle having two fluid ejection areas for cleaning the vehicle window and the see-through area.

FIG. 2C is a schematic view of motor vehicle 1000, which is comprised of roof module 10 and an exemplary embodiment of cleaning device 22. Cleaning device 22 has a cleaning nozzle 24, which can in particular be telescopically deployed and has two fluid ejection areas 26 and 28 for cleaning vehicle window 110 and see-through area 18. Such a cleaning nozzle 24 can essentially be configured like the cleaning nozzle 24 shown in FIG. 3 but technically differ from it in that it can be moved in particular translationally along at least one axis of movement.

Figure 2D:
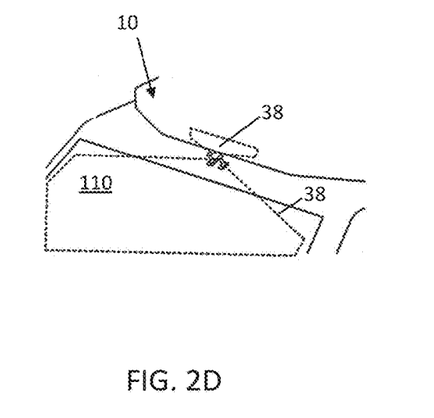
FIG. 2D is a schematic view of a motor vehicle having a roof module and a cleaning device having two deployable cleaning nozzles for cleaning the vehicle window and the see-through area.

FIG. 2D is a schematic view of motor vehicle 1000, which is comprised of roof module 10 and an exemplary embodiment of cleaning device 22. Cleaning device 22 has two deployable cleaning nozzles 24, which are in particular disposed separately from each other, for cleaning vehicle window 110 and see-through area 18. Such a cleaning nozzle 24 can essentially be configured like the cleaning nozzle 24 shown in FIG. 4 but technically differ from it in that can be moved in particular translationally and/or telescopically along at least one axis of movement.

Figure 2E:
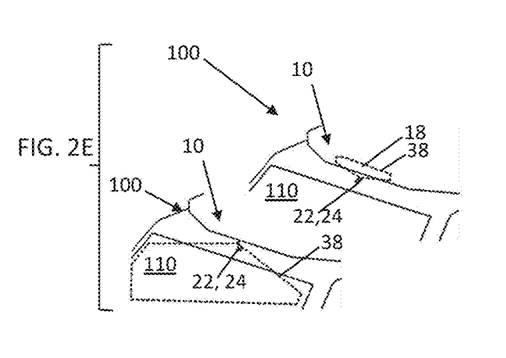
FIG. 2E is a schematic view of a motor vehicle having a roof module and a cleaning device having two cleaning nozzles for cleaning the vehicle window and the see-through area, one of the cleaning nozzles being deployable and the other cleaning nozzle being fixed.

FIG. 2E is a schematic view of motor vehicle 1000, which is comprised of roof module 10 and an exemplary embodiment of cleaning device 22. Cleaning device 22 has two cleaning nozzles 24 for cleaning vehicle window 110 and see-through area 18, one cleaning nozzle 24 being deployable and the other cleaning nozzle 24 being fixed to, in particular immobile on, roof module 10. Such a cleaning nozzle 24 can essentially be configured like the cleaning nozzle 24 shown in FIG. 4. However, one cleaning nozzles 24 technically differs in that it can be moved in particular translationally and/or telescopically along at least one axis of movement.

Figure 2F:
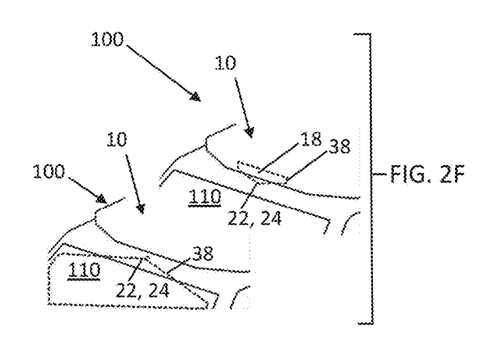
FIG. 2F is a schematic view of a motor vehicle having a roof module and a cleaning device having two rotatable cleaning nozzles for cleaning the vehicle window and the see-through area.

FIG. 2F is a schematic view of motor vehicle 1000, which is comprised of roof module 10 and an exemplary embodiment of cleaning device 22. Cleaning device 22 has two rotatable cleaning nozzles 24 for cleaning vehicle window 110 and see-through area 18. Such a cleaning nozzle 24 can essentially be configured like the cleaning nozzle 24 shown in FIG. 4 but technically differ from it in that it can be rotated about at least one axis of movement.

Figure 2G:
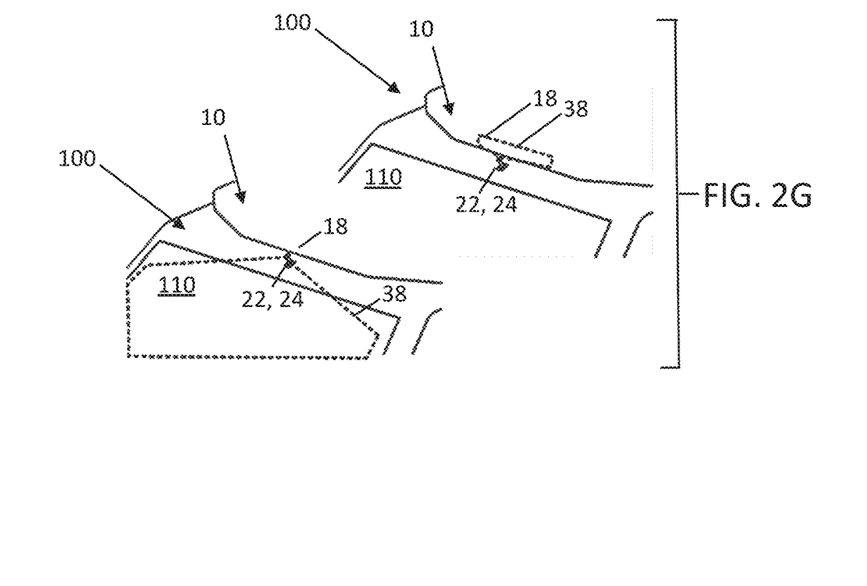
FIG. 2G is a schematic view of a motor vehicle having a roof module and a cleaning device having two cleaning nozzles for cleaning the vehicle window and the see-through area, one of the cleaning nozzles being deployable and the other cleaning nozzle being rotatable.

FIG. 2G is a schematic view of motor vehicle 1000, which is comprised of roof module 10 and an exemplary embodiment of cleaning device 22. Cleaning device 22 has two cleaning nozzles 24 for cleaning vehicle window 110 and see-through area 18, one cleaning nozzle 24 being deployable and the other cleaning nozzle 24 being rotatable. The explanations above regarding the cleaning nozzles 24 apply accordingly.

Of course, each embodiment can also employ other cleaning nozzles, such as those shown in FIGS. 3 to 6, in any combination. Naturally, other cleaning nozzles 24 can be employed according to the present embodiments, as well. Moreover, note that FIGS. 2E to 2G each show two views of motor vehicle 1000 in order to more clearly indicate the option of a separate, i.e., mutually independent, cleaning of see-through area 18 and vehicle window 110. Such an independent cleaning of vehicle window 110 and see-through area 18 can be achieved, for example, by actuating two valves of a cleaning nozzle 24 and/or if a cleaning nozzle 24 has two separate fluid line paths.

Hereinafter, two other embodiments of cleaning nozzles 24 will be described.

Figure 5:
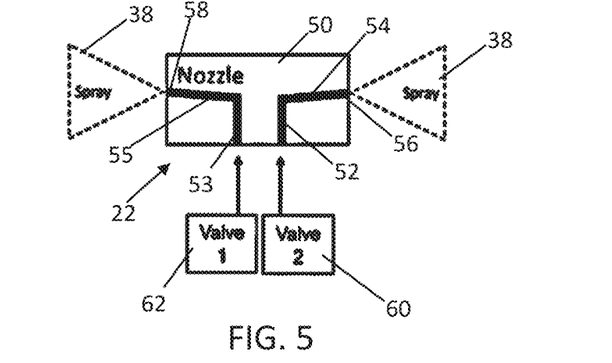
FIG. 5 is a schematic sectional view of a third exemplary embodiment of a cleaning nozzle.

FIG. 5 is a schematic sectional view of a two-way cleaning nozzle 24. As can be seen in the sectional view of FIG. 5, cleaning nozzle 24 has a solid, in particular one-piece or multi-piece, nozzle body 50, for example. Two supply channels 52 and 53, which each end in at least one fluid ejection channel 54 or 55, can preferably be formed in nozzle body 50. The two fluid ejection channels 54 in turn end in fluid ejection areas 56 and 58. The cleaning nozzle 24 shown in FIG. 5 is preferably supplied by two valves 60 and 62. Valve 60 is preferably configured to selectively and/or partially open and/or close supply channel 52 in order to transport the cleaning fluid and/or the cleaning medium to fluid ejection areas 56. Valve 62 is preferably configured to selectively and/or partially open and/or close supply channel 53 in order to transport the cleaning fluid and/or the cleaning medium to fluid ejection areas 58. Fluid ejection area 56 is preferably directed at vehicle window 110. Fluid ejection area 58 is preferably directed at see-through area 18.

Figure 6:
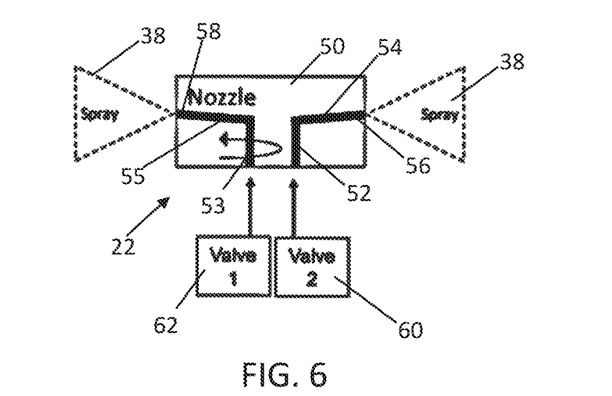
FIG. 6 is a schematic sectional view of a fourth exemplary embodiment of a cleaning nozzle.

FIG. 6 shows a similar cleaning nozzle 24 as FIG. 5. Technically, the cleaning nozzle 24 shown in FIG. 6 differs in that at least one of fluid ejection areas 56 and 58 can be moved by turning and/or rotating at least a portion of nozzle body 50. Of course, the entire nozzle body 50 can be moved by rotation and/or translation. The mobility of such a cleaning nozzle 24 allows the cleaning fluid and/or the cleaning medium to preferably be spatially directed at vehicle window 110 and/or see-through area 18. This can increase a cleaning effect.

REFERENCE SIGNS 10 roof module
12 panel component
14 roof skin
16 environment sensor
17 housing
18 see-through area
20 optical axis
22 cleaning device
24 cleaning nozzle
26 fluid ejection area
28 fluid ejection area
30 nozzle body
32 supply channel
34 exit channel 36 valve
38 spraying area
40 nozzle body
42 supply channel
44 exit channel
46 fluid ejection area
48 valve
50 nozzle body
52 supply channel
53 supply channel
54 fluid ejection channel
55 fluid ejection channel
56 fluid ejection area
58 fluid ejection area
60 valve
62 valve
100 vehicle roof
102 transverse rail
104 roof frame
106 longitudinal rail
108 panoramic roof
110 windshield
1000 motor vehicle
x longitudinal vehicle direction
y vehicle width direction

The invention claimed is:

1. A motor vehicle comprising:
at least one vehicle window and at least one roof module, which forms a vehicle roof of the motor vehicle,
the roof module comprising a panel component, which at least partially forms a roof skin of the vehicle roof, the roof skin serving as an outer sealing surface,
at least one environment sensor configured to send and/or receive electromagnetic signals for detecting a vehicle environment through a see-through area separated from the at least one vehicle window and arranged at the at least one roof module, and
at least one cleaning device having at least one cleaning nozzle,
wherein the at least one cleaning nozzle is arranged specifically above the at least one vehicle window and is configured to clean the see-through area and the at least one vehicle window.

2. The motor vehicle according to claim 1, wherein the at least one cleaning nozzle comprises at least two fluid ejection areas, wherein at least one of fluid ejection areas is directed at the see-through area and at least one of another of fluid ejection areas is directed at the at least one vehicle window.

3. The motor vehicle according to claim 1, wherein the at least one cleaning nozzle comprises at least two fluid ejection channels, which are independent from each other and one of which is directed at the see-through area and the other one of which is directed at the at least one vehicle window.

4. The motor vehicle according to claim 1, wherein the cleaning device comprises at least two cleaning nozzles, one of which is directed at the see-through area and the other one of which is directed at the at least one vehicle window.

5. The motor vehicle according to claim 2, wherein the at least two fluid ejection areas are supplied by a common valve.

6. The motor vehicle according to claim 3, wherein the at least two fluid ejection channels are supplied by at least two valves.

7. The motor vehicle according to claim 1, wherein the at least one environment sensor comprises a lidar sensor or a radar sensor or a camera sensor or a multi-camera sensor or an ultrasonic sensor.

8. A roof for a motor vehicle having at least one vehicle window, comprising:
at least one roof module, which forms a vehicle roof of the motor vehicle,
the roof module comprising a panel component, which at least partially forms a roof skin of the vehicle roof, the roof skin serving as an outer sealing surface,
at least one environment sensor configured to send and/or receive electromagnetic signals for detecting a vehicle environment through a see-through area separated from the at least one vehicle window and arranged at the at least one roof module, and
at least one cleaning device having at least one cleaning nozzle,
wherein the at least one cleaning nozzle is arranged specifically above the at least one vehicle window and is configured to clean the see-through area and the at least one vehicle window.

* * * * *